United States Patent
Abelovski et al.

(10) Patent No.: US 10,590,293 B2
(45) Date of Patent: Mar. 17, 2020

(54) ULTRAVIOLET (UV) CURABLE INKJET INK COMPOSITIONS

(71) Applicant: Hewlett-Packard Development Company, L.P., Houston, TX (US)

(72) Inventors: Benjamin Abelovski, Escondido, CA (US); Tienteh Chen, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/740,254

(22) PCT Filed: Oct. 19, 2015

(86) PCT No.: PCT/US2015/056201
§ 371 (c)(1),
(2) Date: Dec. 27, 2017

(87) PCT Pub. No.: WO2017/069729
PCT Pub. Date: Apr. 27, 2017

(65) Prior Publication Data
US 2018/0194956 A1 Jul. 12, 2018

(51) Int. Cl.
*C09D 11/322* (2014.01)
*C09D 11/326* (2014.01)
*B41M 7/00* (2006.01)
*C09D 11/106* (2014.01)
*C09D 11/101* (2014.01)

(52) U.S. Cl.
CPC ......... *C09D 11/322* (2013.01); *B41M 7/0081* (2013.01); *C09D 11/101* (2013.01); *C09D 11/106* (2013.01); *C09D 11/326* (2013.01)

(58) Field of Classification Search
None
See application file for complete search history.

(56) References Cited

U.S. PATENT DOCUMENTS

| | | | |
|---|---|---|---|
| 6,341,856 B1 | 1/2002 | Thompson et al. | |
| 7,281,789 B2 | 10/2007 | Goto et al. | |
| 9,458,334 B1* | 10/2016 | Samuel | C09D 11/102 |
| 2002/0040660 A1* | 4/2002 | Momose | C09D 11/322 |
| | | | 106/31.75 |
| 2005/0173680 A1 | 8/2005 | Yang | |
| 2005/0225615 A1* | 10/2005 | Sader | C09D 11/30 |
| | | | 347/95 |

(Continued)

FOREIGN PATENT DOCUMENTS

| | | |
|---|---|---|
| CN | 104804526 | 7/2015 |
| EP | 0787778 | 7/1996 |

OTHER PUBLICATIONS

International Search Report and Written Opinion for International Application No. PCT/US2015/056201 dated Jan. 8, 2016, 12 pages.

*Primary Examiner* — Shelby L Fidler
(74) *Attorney, Agent, or Firm* — Dierker & Kavanaugh PC

(57) ABSTRACT

An example of an ultraviolet (UV) curable inkjet ink composition includes a pigment dispersed by an anionic polymeric dispersant, an organic co-solvent, polyvinylpyrrolidone, a photoinitiator, a UV radiation curable polyurethane, and a balance of water. The polyvinylpyrrolidone has a number average molecular weight ranging from about 10,000 to about 40,000.

13 Claims, 5 Drawing Sheets

(56) References Cited

U.S. PATENT DOCUMENTS

| | | | |
|---|---|---|---|
| 2006/0132565 A1* | 6/2006 | Szajewski | C09D 11/40 |
| | | | 347/100 |
| 2006/0217457 A1* | 9/2006 | Trueba | C09D 11/101 |
| | | | 523/160 |
| 2006/0264534 A1 | 11/2006 | Ma et al. | |
| 2007/0043144 A1 | 2/2007 | House et al. | |
| 2008/0105160 A1 | 5/2008 | Doi et al. | |
| 2009/0270581 A1 | 10/2009 | Tielemans et al. | |
| 2010/0330296 A1 | 12/2010 | Loccufier et al. | |
| 2013/0085217 A1 | 4/2013 | Iu et al. | |
| 2014/0168331 A1* | 6/2014 | Abelovski | C09D 11/322 |
| | | | 347/95 |
| 2014/0362150 A1 | 12/2014 | Yamashita et al. | |
| 2015/0094411 A1 | 4/2015 | Brown et al. | |

* cited by examiner

ULTRAVIOLET (UV) CURABLE INKJET INK COMPOSITIONS

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features of examples of the present disclosure will become apparent by reference to the following detailed description and drawings, in which like reference numerals correspond to similar, though perhaps not identical, components.

DETAILED DESCRIPTION

Figure 1:
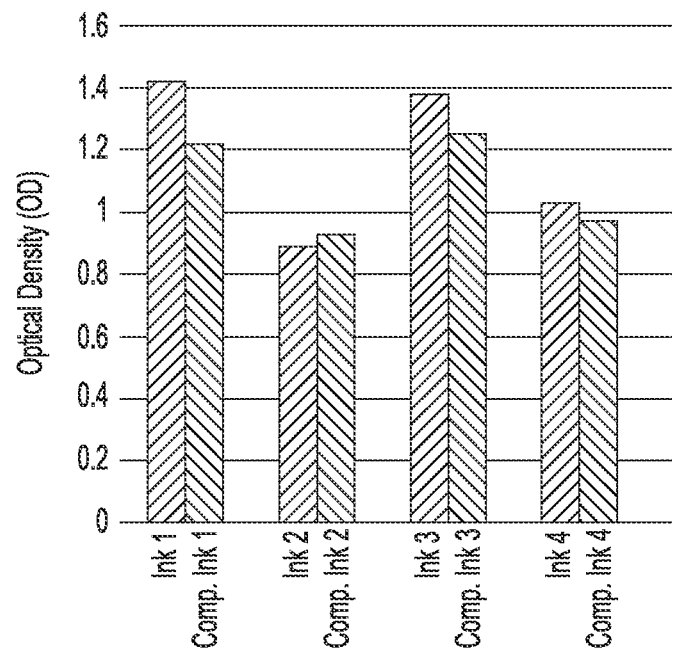
FIG. 1 is a bar graph depicting optical density measurements of examples of the ink disclosed herein and comparative inks including no polyvinylpyrrolidone applied to coated offset media.

In inkjet printing, polyurethane dispersions may be added to inkjet inks to improve the durability of the resulting print. In particular, radiation curable polyurethanes have been added to improve the scratch and abrasion resistance of the resulting prints. However, it has been found that the amount and type of polyurethane used in the inkjet inks may lead to complications with the jetting performance and reliability (e.g., nozzle health). In addition, the presence of polyurethane can deleteriously affect the image quality (e.g., gloss and optical density). For example, polyurethane may undesirably coagulate when applied to a pre-treatment fixing fluid as a result of a reaction between the polyurethane and component(s) in the pre-treatment fixing fluid.

Examples of the inkjet ink composition disclosed herein, which include polyvinylpyrrolidone and the UV radiation curable polyurethane dispersion disclosed herein, exhibit several desirable characteristics, some of which are improved drop weight, improved drop velocity, improved optical density, and improved gloss. Improved ink jettability (e.g., drop weight and drop velocity) may be due, at least in part, to the formation of a soft film on the printhead resistor in the firing chamber, which may be caused by the polyvinylpyrrolidone. The soft film may keep the resistor free of contaminants and soften the impact of the collapsing drive bubble on the resistor surface, which may lead to better resistor function/heat transfer and therefore, better drop formation and ejection. Improved image quality (e.g., gloss and optical density) on coated media may be due, at least in part, to the formation of a fine film in the ink layer, which may be caused by the polyvinylpyrrolidone. The fine film in the ink layer may lead to a smoother ink surface and therefore, better gloss and optical density.

Additionally, the ink composition disclosed herein is able to improve the drop weight, drop velocity, optical density, and gloss without negatively affecting decap performance or the physical stability of the ink. The term "decap performance," as referred to herein, means the ability of the inkjet ink to readily eject from the printhead, upon prolonged exposure to air. The decap time is measured as the amount of time that a printhead may be left uncapped (i.e., exposed to air) before the printer nozzles no longer fire properly, potentially because of clogging, plugging, or retraction of the colorant from the drop forming region of the nozzle/firing chamber. The length of time a thermal inkjet pen can remain unused and uncapped before spitting would be required to form an acceptable quality ink drop is called decap time, or first drop decap time. Another decap metric is the number of spits required to get the pen healthy at a specific time interval. A decreased decap time can lead to poor print reliability. As such, the longest decap time that would give acceptable first drop quality or the fewest number of spits required at any given decap time would be desirable for any given ink.

The term "physical stability" as referred to herein, means the ability of the inkjet ink to remain unchanged over time. The change in particle size is measured as the percentage of size change in the ink particles over a set time. To facilitate the measurement of the particle size percentage change, the ink formulations may be stored in an accelerated storage (AS) environment. The particle size may be measured before and after the ink formulations have been stored in the AS environment. The accelerated storage environment may be an environment that has a temperature ranging from about 45° C. to about 60° C. In an example, the accelerated storage environment is an oven baked at a temperature of about 50° C. and the ink formulations are stored in the AS environment for about one week. A large particle size change can lead to a short shelf life of the ink formulation. As one example, a large particle size change may cause phase separation in the bulk ink (e.g., pigments separating from the vehicle), which would cause the ink to be unusable. As another example, a large particle size change may also change the jettability performance of the ink over time, which makes it difficult to establish consistent printhead firing parameters for the ink and in some case may cause the ink to be unjettable. Additionally, a large particle size change changes the image quality of the ink on media, which makes it impossible to establish consistent image quality standards. As such, the longest time that would give an acceptable particle size change percentage would be desirable for any given ink. An acceptable particle size change is a less than 10% change in the volume-average particle size after an accelerated storage (AS) test.

Another benefit of using polyvinylpyrrolidone is that polyvinylpyrrolidone is approved for use in food packaging inks. It is listed on the positive Swiss A ordinance list. Thus, examples of the ink composition disclosed herein may be used on food packaging media.

Some examples of the inkjet ink composition disclosed herein include an anti-kogation agent (e.g., oleth-3-phosphate commercially available as CRODAFOS™ N-3A) in addition to polyvinylpyrrolidone and the UV radiation curable polyurethane dispersion disclosed herein. Examples of the inkjet ink composition disclosed herein that include an anti-kogation agent tend to have improved drop weight, improved drop velocity, improved optical density, and improved gloss when compared to examples of the inkjet ink composition that do not include an anti-kogation agent. Improved ink jettability (e.g., drop weight and drop velocity) may be due, at least in part, to the anti-kogation agent acting as a resistor cleaner, which enables better drop formation and therefore, better drop weight and drop velocity. Improved image quality (e.g., gloss and optical density) on coated media may be due, at least in part, to the slightly higher drop weight and drop velocity exhibited by the anti-kogation-agent-containing inks. Higher drop weight and drop velocity may allow more ink to be deposited in a more regular fashion, which may create a thicker, stronger film, and therefore higher optical density and gloss. The improved ink jettability and image quality of the images formed with the ink may be due to a synergistic effect between the anti-kogation agent and the polyvinylpyrrolidone. It is believed that both the anti-kogation agent and the polyvinylpyrrolidone help to keep the resistor free of contaminates, and that together the anti-kogation agent and the polyvinylpyrrolidone create a resistor condition that is optimal for the jettability of the ink and the print quality of the images formed with the ink.

The UV radiation curable inkjet ink disclosed herein, which includes the polyvinylpyrrolidone and the UV radiation curable polyurethane, may be included in a single cartridge ink set or a multiple-cartridge ink set. In the multiple-cartridge ink set, any number of the multiple inks may have polyvinylpyrrolidone and the UV radiation curable polyurethane incorporated therein. As used herein, the terms "ink(s)" and "ink composition" refer to the UV radiation curable, inkjet ink.

In one example, the ink composition disclosed herein includes a pigment, an anionic polymeric dispersant, an organic co-solvent, the polyvinylpyrrolidone, a photoinitiator, the UV radiation curable polyurethane, and a balance of water. In some examples, the ink composition consists of these components, with no other components.

As used herein, "ink vehicle" may refer to the liquid fluid in which the UV radiation curable polyurethane (e.g., a UV radiation curable polyurethane dispersion) and the colorant (e.g., a colorant dispersion) are placed to form the ink(s). A wide variety of ink vehicles may be used with the ink sets and methods of the present disclosure. The ink vehicle may include water alone or in combination with a mixture of a variety of additional components. Examples of these additional components may include the organic co-solvent(s), surfactant(s), antimicrobial agent(s), anti-kogation agent(s), the polyvinylpyrrolidone, and the photoinitiator(s).

The ink vehicle may include an organic co-solvent present in total in the ink(s) in an amount ranging from about 5 wt % to about 20 wt % (based on the total wt % of the ink composition), depending, at least in part, on the jetting architecture. In an example, the co-solvent in present in the ink(s) in an amount of about 10 wt % based on the total wt % of the ink(s). It is to be understood that other amounts outside of this example and range may also be used. Classes of organic co-solvents that may be used include aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the ink vehicle may include 1-(2-hydroxyethyl)-2-pyrrolidone.

As mentioned above, the ink vehicle may also include surfactant(s). As an example, the ink composition may include non-ionic, cationic, and/or anionic surfactants, which may be present in an amount ranging from about 0.01 wt % to about 1 wt % based on the total wt % of the ink composition. In at least some examples, the ink vehicle may include a silicone-free alkoxylated alcohol surfactant such as, for example, TEGO® Wet 510 (EvonikTegoChemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylatedacetylenic diol), SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

The ink vehicle may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, and combinations thereof. In an example, the ink composition may include a total amount of antimicrobial agents that ranges from about 0.1 wt % to about 0.25 wt %. In some instances, the antimicrobial agent may be present in the pigment dispersion that is added to the other ink components.

An anti-kogation agent may also be included in the ink vehicle. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3A or CRODAFOS™ N-3 acid) or dextran 500 k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the ink composition in an amount ranging from about 0.1 wt % to about 1 wt % of the total wt % of the ink(s). In the examples disclosed herein, the anti-kogation agent may improve the jettability of the ink as well as the print quality of the images formed with the ink.

The inkjet ink may also include a photoinitiator. The photoinitiator initiates the polymerization and/or crosslinking of the UV radiation curable polyurethane upon exposure to a suitable stimulus (e.g., electromagnetic radiation). Some examples of the photoinitiator include 1-[4-(2-Hydroxyethoxy)-phenyl]-2-hydroxy-2-methyl-1-propane-1-one (which is commercially available from BASF Corp. as IRGACURE® 2959); acyl phosphine oxide photoinitiators (e.g., IRGACURE® 819, commercially available from BASF Corp.); alpha hydroxy ketone photoinitiators (e.g., IRGACURE® 184, commercially available from BASF Corp.); Iodonium, (4-methylphenyl)[4-(2-methylpropyl)phenyl]-, hexafluorophosphate(1-) (which is commercially available from BASF Corp. as IRGACURE® 250); a high-molecular-weight sulfonium salt (e.g., IRGACURE® 270, commercially available from BASF Corp.); 2-Benzyl-2-dimethylamino-1-(4-morpholinophenyl)-butanone-1 (which is commercially available from BASF Corp. as IRGACURE® 369); alpha amino ketone photoinitiator (e.g., IRGACURE® 379, commercially available from BASF Corp.); a liquid blend of alpha hydroxy ketone/benzophenone photoinitiator (e.g., IRGACURE® 500, commercially available from BASF Corp.); and a liquid photoinitiator blend of acyl phosphine oxide/alpha hydroxy ketone (e.g., IRGACURE® 2022, commercially available from BASF Corp.). Some other suitable photoinitiators include phosphine oxide derivatives, thioxanthone derivatives, and benzophenone derivatives. The photoinitiator is present in the inkjet ink in an amount ranging from about 0.05 wt % to about 1.0 wt % of the total wt % of the ink. In another example, the photoinitiator is present in the in the inkjet ink in an amount ranging from about 0.1 wt % to about 0.6 wt. % of the total wt % of the ink.

In some examples disclosed herein, the ink vehicle of the inkjet ink may also include viscosity modifier(s), material(s) for pH adjustment, sequestering agent(s), preservative(s), jettability additive(s) (e.g., liponic ethylene glycol (LEG-1), available from Liponics), and the like.

The ink composition may be any color, such as black, cyan, magenta, yellow, etc. As such, in addition to the ink vehicle, the ink composition also includes a colorant. In an example, the colorant is an anionically dispersed pigment. In an example, the anionically dispersed pigment is a dispersion including water, the pigment, and an anionic polymer that disperses the pigment (i.e., the anionic polymeric dispersant). In an example, the pigment dispersion may also include, for example, a co-solvent, such as 2-pyrrolidone. The pigment dispersion may be prepared or purchased, and the other components of the ink (e.g., vehicle components) may be slowly added to the pigment dispersion with continuous mixing, to form the ink composition.

As used herein, "pigment" may generally include organic or inorganic pigment colorants, magnetic particles, aluminas, silicas, and/or other ceramics, organo-metallics, metallic particulates, or other opaque particles that introduce color to the ink vehicle. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I.

Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® E, MOGUL® L, AND ELFTEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® RO100, STANDART® RO200, and DORADO® gold-bronze pigments (available from Eckart Effect Pigments, Wesel, Germany).

The total amount of pigment in the ink composition ranges from about 1 wt % to about 5 wt % (based on the total wt % of the ink composition). The average particle size of the pigments may range anywhere from about 50 nm to about 200 nm. In an example, the average particle size ranges from about 80 nm to about 150 nm.

In the examples disclosed herein, the pigment is dispersed by the anionic polymer (i.e., anionic polymeric dispersant). The dispersant may be present in an amount ranging from about 0.1 wt % to about 5 wt % of a total wt % of the ink composition.

In an example, the dispersant may be styrene-acrylic-type dispersants such as acrylic dispersants having i) hydrophilic monomers including acidic monomers, and ii) hydrophobic monomers. The acid number of the dispersant may range from about 120 mg/g to about 300 mg/g. It is to be understood that the styrene-acrylic-type dispersants are water soluble. As such, no latex polymer is present in the ink composition.

Acidic monomers that may be used in the acrylic dispersant may include, for example, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethylmethacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof.

Examples of the hydrophobic monomers that can be polymerized in the acrylic dispersant may include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylatednonyl phenol methacrylate, isobornyl methacrylate, cyclohexyl methacrylate, t-butyl methacrylate, n-octyl methacrylate, lauryl methacrylate, trydecyl methacrylate, alkoxylatedtetrahydrofurfuryl acrylate, isodecyl acrylate, isobornylmethacrylate, and combinations thereof.

The inkjet ink also includes the UV radiation curable polyurethane. In an example, the UV radiation curable polyurethane is present in the UV radiation curable polyurethane dispersion with water. The UV radiation curable polyurethane is present in the ink in an amount ranging from about 1 wt % to about 20 wt % based upon the total wt % of the UV curable inkjet ink composition. In another example, the amount of UV radiation curable polyurethane ranges from about 5 wt % to about 10 wt % or from about 5 wt % to about 15 wt % based upon the total wt % of the UV curable inkjet ink composition. This weight percentage accounts for the weight percent of active polyurethane present in the ink composition, and does not account for the total weight percent of the UV radiation curable polyurethane dispersion in the inkjet ink. As such, the weight percentages given for the UV radiation curable polyurethane do not account for any other components (e.g., water) that may be present when the polyurethane is part of the dispersion. The UV radiation curable polyurethane dispersion may be added with the colorant (e.g., colorant dispersion) and the components of the ink vehicle to form the inkjet ink.

The UV radiation curable polyurethane dispersion may be formed by synthesizing a polyurethane solution (i.e., the polyurethane polymer in an organic solvent), and then ionizing and dispersing the polyurethane solution in water to form the UV radiation curable polyurethane dispersion. The resulting UV radiation curable polyurethane dispersion includes the polyurethane polymer, which is water soluble/dispersible. Each of these steps will be discussed further below.

The UV radiation curable polyurethane is formed from the following components: (a) a polyisocyanate, (b) an acrylate or methacrylate with at least two hydroxyl functional groups and having an acrylate functional group or a methacrylate functional group, (c) another acrylate or methacrylate having a hydroxyl functional group or an amino functional group, and (d) a hydroxyl or an amine containing a sulfonate functional group. In some instances, the UV radiation curable polyurethane is formed from components (a), (b), (c), (d), and (e), where (e) is a polyol.

For component (a), any suitable polyisocyanate may be used. For example, a polyisocyanate having an average of two or more isocyanate groups may be used. In an example, the polyisocyanate may be an aliphatic, cycloaliphatic, araliphatic, or aromatic polyisocyanate, as well as products of their oligomers, used alone or in mixtures of two or more. In an example, the polyisocyanate is an aliphatic polyisocyanate or a cycloaliphaticpolyisocyanate, either of which has a reduced tendency to yellow. Some example polyisocyanates include hexamethylene-1,6-diisocyanate (HDI), 1,12-dodecane diisocyanate, 2,2,4-trimethyl-hexamethylene-diisocyanate (TDMI), 2,4,4-trimethyl-hexamethylene diisocyanate, 2-methyl-1,5-pentamethylene diisocyanate, isophoronediisocyanate (IPDI), and combinations thereof. The amount of the polyisocyanate within the UV radiation curable dispersion ranges from about 20 wt % to about 50 wt % of the total wt % of the UV radiation curable polyurethane. In an example, polyisocyanate makes up from about 30 wt % to about 50 wt % of the UV radiation curable polyurethane.

Turning to component (b), component (b) renders the polyurethane curable via ultraviolet light. Component (b) includes an acrylate or methacrylate with at least two hydroxyl functional groups and an acrylate functional group or a methacrylate functional group. In this example, component (b) is present in an amount ranging from 10 wt % to about 40 wt % based on the total wt % of the UV radiation curable polyurethane. In another example, component (b) may be present in an amount ranging from about 20 wt % to about 40 wt % based on the total wt % of the UV radiation curable polyurethane.

Some examples of the acrylate or methacrylate with at least two hydroxyl functional groups include those obtained from the reaction of diglycidyl compounds with (meth)acrylic acid. Aliphatic diglycidyl compounds derived from alpha, omega diols having 4 to 12 carbon atoms or from polyoxyalkylenediols (such as polyethylene glycol, polypropylene glycol, or mixtures thereof that contain oxyalkylene group(s)) may be used. Some specific examples include 1,4-butanediol diglycidyl ether, 1,6-hexanediol diglycidyl ether, cyclohexanedimethanoldiglycidyl ether, polyethylene glycol diglycidyl ether, polypropylene glycol diglycidyl ether, hydrogenated bisphenol A diglycidyl ether (BGDA or BADGE), hydrogenated bisphenol F diglycidyl ether, and their ethoxylated and/or propoxylated equivalents. An additional example is 1,6-hexanediylbis[oxy(2-hydroxy-3,1-propanediyl)] bisacrylate. Some commercially available examples include MIRAMER® PE-210 (bisphenol A epoxy acrylate) and MIRAMER® PE-230 (aliphatic alkyl epoxy acrylate) (both of which are available from Miwon Chemical).

In further examples, component (b) includes aromatic diglycidyl compounds derived from bisphenol A and bisphenol F. Specifically, bisphenol A diglycidyl ether, bisphenol F diglycidyl ether, and their ethoxylated and/or propoxylated equivalents may be used. Diglycidyl esters may also be used, such as diglycidylphthalate, N,N-diglycidylaniline, or N,N-diglycidyl-4-glycidyloxyaniline. Some specific examples include a diacrylate ester of bisphenol A diglycidyl ether (BGDA) and a dimethacrylate ester of bisphenol A diglycidyl ether (BGDM).

Turning now to component (c), component (c) is an acrylate or methacrylate having one hydroxyl functional group or one amino functional group. Similar to component (b), component (c) also renders the polyurethane curable via ultraviolet light.

The amount of component (c) in the UV radiation curable polyurethane dispersion ranges from greater than 10 wt % to about 65 wt % based upon the total wt % of the UV radiation curable polyurethane. In an example, component (c) makes up from about 20 wt % to about 50 wt % of the UV radiation curable polyurethane. Within the final polyurethane, component (c) forms an end acrylate.

Some examples of component (c) include the esterification products of aliphatic and/or aromatic polyols with acrylic acid or methacrylic acid. These products have a residual OH functionality of about 1. Some of these products also have at least two acrylic functionalities. Examples of component (c) include the partial esterification products of acrylic acid and/or methacrylic acid with tri-, tetra-, penta- or hexahydric polyols or mixtures thereof. These modified or unmodified polyols are partly esterified with acrylic acid, methacrylic acid or mixtures thereof until the desired residual hydroxyl functionality is reached. Suitable examples include acrylic or the methacrylic esters with linear and branched polyols in which the at least one hydroxyl functionality remains free, such as hydroxyalkylacrylates or hydroxyalkylmethacrylates having 1 to 20 carbon atoms in the alkyl group. Some specific examples include hydroxyethylacrylate (HEA), hydroxyethylmethacrylate (HEMA), hydroxybutylacrylate (HBA), hydroxybutylmethacrylate (HBMA), (3-(acryloxy)-2-hydroxypropyl methacrylate) (AHPMA), glycerol diacrylate, trimethylolpropanediacrylate, pentaerythritoltriacrylate (PETA), ditrimethylolpropanetriacrylate (DTPTA), dipentaerythritolpentaacrylate (DPPA), and (poly)ethoxylated and/or (poly)propoxylated equivalents of glycerol diacrylate, trimethylolpropanediacrylate, PETA, DTPTA, or DPPA.

The UV radiation curable polyurethane dispersion further includes component (d). Component (d) is a hydroxyl or an amine containing a sulfonate functional group. Examples include taurine and aminoethylaminopropylsulfonate (EPS).

The amount of component (d) within the UV radiation curable polyurethane dispersion ranges from 1 wt % to about 15 wt % based upon the total wt % of the UV radiation curable polyurethane. In an example, component (d) makes up from about 2 wt % to about 8 wt % of the polyurethane.

Component (e) is a polyol. The term "polyol", as used herein, means any product having an average of about 2 or more hydroxyl groups per molecule. Some examples of suitable polyols for component (e) may be part of a first class of polyols. As examples, the first class of polyols has a number average molecular weight ranging from greater than 500 to about 5,000. In any of these examples, component (e) is a macro-glycol. Examples of suitable polyols of the first class include polyester polyols, polyether polyols, polycarbonate polyols, poly(ethyleneoxide) polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols, hydrogenated polybutadiene polyols, polyisobutylene polyols, polyacrylate polyols, halogenated polyesters and polyethers, or mixtures thereof. In an example, the polyol is poly(propyleneglycol), poly(tetrahydrofuran), poly(ethyleneoxide), a polycarbonate polyol, or a polyester polyol.

Other examples of suitable polyols for component (e) may be part of a second class of polyols. The second class has a number average molecular weight that is 500 or lower. Examples of suitable polyols of the second class include 1,2-propanediol, 1,3-propanediol, 1,2-butanediol, 1,3-butanediol, 1,4-butanediol, 1,5-pentanediol, 3-methylpentane-1,5-diol, 1,6-hexanediol, neopentylglycol, cyclohexane-1,4-dimethanol, 1,2-cyclohexanediol, 1,4-cyclohexanediol, 2-ethyl-3-propylpentanediol, 2,4-dimethylpentanediol, 2-ethyl-2-butylpropanediol, diethyleneglycol, triethyleneglycol, tetraethyleneglycol, dipropyleneglycol, tripropyleneglycol, N-substituted ethanolamines, and mixtures thereof. In an example, the polyol is selected from 1,4-butanediol, 1,5-pentanediol, 3-methylpentane-1,5-diol, 1,6-hexanediol, neopentylglycol, and cyclohexane-1,4-dimethanol, trimethylolpropane, glycerol, or pentaerythritol.

The amount of component (e) in the UV radiation curable polyurethane dispersion ranges from 0 wt % to about 30 wt % based upon the total wt % of the UV radiation curable polyurethane.

In an example of the first step of the method for making the UV radiation curable polyurethane dispersion, components (a) and (b), and in some instances (e), are mixed in a reactor with the organic solvent (e.g., methyl ethyl ketone (MEK), tetrahydrofuran (THF), ethyl acetate, acetone, or combinations thereof) and a catalyst (e.g., dibutyl tin dilaurate, bismuth octanoate, or 1,4-diazabicyclo[2.2.2]octane). The reactor may be maintained at a constant temperature and under a dry air mixture. The components may be mixed and the polymerization reaction may be allowed to occur until the % NCO reaches the theoretical value. In an example, the reaction time ranges from about 2 hours to about 4 hours. In another example, the polymerization reaction occurs for about 2 hours at 60° C. to achieve the theoretical value of the % NCO.

In an example of the second step of the method for making the polyurethane polymer, component (c) is then added to the polymerization reaction of components (a) and (b) (and in some instances (e)), and polymerization is continued until the % NCO reaches the theoretical value. In this step, the polymerization reaction may be allowed to occur for a time ranging from about 2 hours to about 4 hours. In an example, the polymerization reaction occurs for about 4 hours at 60° C. to achieve the theoretical value of the % NCO.

In an example of the third step of the method for making the polyurethane polymer, component (d) is dissolved in one equivalent of a base and a sufficient amount of deionized water to fully dissolve component (d). Some examples of the base include ammonia, trimethylamine, triethylamine, sodium hydroxide, potassium hydroxide, and lithium hydroxide. The polymer solution made from components (a), (b), and (c), and in some instances (e), is cooled to a temperature ranging from about 30° C. to about 50° C. The aqueous solution of component (d) is added to the polymer solution with vigorous mixing at a temperature ranging from about 30° C. to about 50° C. for about 5 minutes to about 30 minutes.

The mixture may be stirred and organic solvent may be removed by distillation to form the polyurethane dispersion.

As mentioned above, the UV radiation curable polyurethane dispersion may be added with the colorant (e.g., colorant dispersion) and the other components of the ink vehicle to form the inkjet ink. The balance of the ink composition is water. In one example, the organic co-solvent is mixed with the pigment dispersion (including water and the pigment dispersed by the anionic polymeric dispersant), and the photoinitiator is mixed with the polyurethane dispersion (including water and the UV curable polyurethane). The polyurethane dispersion may then be added to the pigment dispersion to form an example of the inkjet ink disclosed herein.

After the ink is prepared, the ink(s) may be applied to a medium using any inkjet printer (e.g., thermal, piezoelectric, etc.). In an example, the ink(s) may be applied to a coated offset medium. A coated offset medium is any paper coated to impart better image quality by providing some degree of surface gloss, smoothness, and reduced ink absorbency. Examples of commercially available coated offset media include STERLING® Ultra Gloss (New Page Corp.) and UTOPIA® (Appleton Coated LLC). In other examples, the medium may be coated or uncoated paper. The medium may also be a vinyl or plastic material.

The printed ink may then be exposed to curing. Any suitable source of UV radiation may be used to initiate curing, such as, for example, UV lamps, LED (light emitting diode) lamps, LEP (light emitting plasma) plasma torches, or lasers operating in the UV range. Electron beam curing may also be used. The actual wavelength (within the UV range of 280 nm to 400 nm) and intensity of the ultraviolet radiation used may vary, depending at least in part, upon the curable polymer components (e.g., the polyurethane) included in the ink. Once the ink is cured, a film forms on the medium.

The inkjet ink also includes polyvinylpyrrolidone. Polyvinylpyrrolidone is a polymer formed from the polymerization of the N-vinylpyrrolidone molecule and is commercially available from many suppliers including BASF Corp., Sigma-Aldrich, TCI, and Ashland Chemical. Examples of commercially available polyvinylpyrrolidone include PVP40 ($M_n$ ~40,000, Sigma-Aldrich), PVP10 ($M_n$ ~10,000, Sigma-Aldrich), Polyvinylpyrrolidone K 30 ($M_n$ ~40,000, TCI), PVP K-15 ($M_n$ ~10,000 to ~15,000, Ashland Chemical), and PVP K-30 ($M_n$ ~40,000, Ashland Chemical).

The polyvinylpyrrolidone has a number average molecular weight ranging from about 10,000 to about 40,000. In an example, the polyvinylpyrrolidone is present in an amount ranging from about 0.1 wt % to about 5 wt % (based on the total wt % of the ink composition). As mentioned above, the polyvinylpyrrolidone may be added with the colorant (e.g., colorant dispersion), the UV radiation curable polyurethane (e.g., polyurethane dispersion) and the other components of the ink vehicle to form the inkjet ink.

Polyvinylpyrrolidone may be expected to deleteriously affect the jettability of the inkjet ink, in part because it can increase the viscosity. However, the examples disclosed herein illustrate that the jettability (as observed through drop weight, drop velocity, and decap) was desirable across several colors (including black and cyan).

To further illustrate the present disclosure, examples are given herein. It is to be understood that these examples are provided for illustrative purposes and are not to be construed as limiting the scope of the present disclosure.

EXAMPLES

Example 1

Several examples of the UV radiation curable inkjet ink composition, including the polyvinylpyrrolidone and a polyurethane dispersion, and several comparative UV radiation curable inkjet ink compositions were prepared. The polyvinylpyrrolidone used in the example ink compositions had a number average molecular weight of about 10,000. The example and comparative ink compositions were prepared with either a black pigment (present in a dispersion with water and a styrene acrylate dispersant) or a cyan pigment (present in a dispersion with water and a styrene acrylate dispersant), and either the UV radiation curable polyurethane, referred to herein as PUD-620, or a commercially available UV radiation curable polyurethane, namely LUX® 260 (manufactured by Alberdingk Boley). The general formulation of the example and comparative ink compositions are shown in Table 1, with the wt % of each component that was used. The weight percentages of the styrene acrylate pigment dispersion (labeled black pigment dispersion and cyan pigment dispersion) and the polyurethane dispersion (labeled PUD) represent, respectively, the total pigment solids and the total polyurethane solids present in the final formulations.

TABLE 1

| Ingredient | Specific component | Ink 1 (wt %) | Comp. Ink 1 (wt %) | Ink 2 (wt %) | Comp. Ink 2 (wt %) | Ink 3 (wt %) | Comp. Ink 3 (wt %) | Ink 4 (wt %) | Comp. Ink 4 (wt %) |
|---|---|---|---|---|---|---|---|---|---|
| PVP | Polyvinylpyrrolidone, MW ~10,000 | 0.50 | 0 | 0.50 | 0 | 0.50 | 0 | 0.50 | 0 |
| PUD | PUD-620 | 5.00 | 5.00 | 0 | 0 | 5.00 | 5.00 | 0 | 0 |
| | LUX ® 260 | 0 | 0 | 5.00 | 5.00 | 0 | 0 | 5.00 | 5.00 |
| Co-solvent | 1-(2-hydroxyethyl)-2-pyrrolidone | 10.00 | 10.00 | 10.00 | 10.00 | 10.00 | 10.00 | 10.00 | 10.00 |
| Anti-Kogation agent | CRODAFOS ® N3A | 0.50 | 0.50 | 0.50 | 0.50 | 0.50 | 0.50 | 0.50 | 0.50 |
| Surfactant | SURFYNOL ® CT-211 | 0.64 | 0.64 | 0.64 | 0.64 | 0.64 | 0.64 | 0.64 | 0.64 |
| Additive | LEG-1 | 1.00 | 1.00 | 1.00 | 1.00 | 1.00 | 1.00 | 1.00 | 1.00 |
| Photoinitiator | IRGACURE ® 819 | 0.10 | 0.10 | 0.10 | 0.10 | 0.10 | 0.10 | 0.10 | 0.10 |
| Colorant | Black pigment dispersion | 2.75 | 2.75 | 2.75 | 2.75 | 0 | 0 | 0 | 0 |
| | Cyan pigment dispersion | 0 | 0 | 0 | 0 | 2.50 | 2.50 | 2.50 | 2.50 |
| Water | | Balance | Balance | Balance | Balance | Balance | Balance | Balance | Balance |

PUD-620 was synthesized as follows:

(Part 1) 103.4 g of bisphenol A glycerolate diacrylate (BGDA), 1.03 g of 4-methoxyphenyl (MEHQ), 142.3 g of isophorone diisocyanate (IPDI), and 164 g of acetone were mixed in a 500 ml 4-neck round bottom flask. A mechanical stirrer (with glass rod and a TEFLON® blade) and a condenser were attached. The flask was immersed in a constant temperature bath at 60° C. The reactor system was maintained under dry oxygen blanket. 12 drops of dibutyl tin dilaurate (DBTDL) were added to initiate the polymerization. Polymerization was continued for 2 hours at 60° C. until the % NCO reached the theoretical value. A 0.5 g sample was withdrawn for % NCO titration to confirm reaction.

(Part 2) 114.26 g of 3-(acryloyloxy)-2-hydroxypropyl methacrylate (AHPMA), 1.14 g of MEHQ, and 66 g of acetone were mixed in a beaker and added to the reactor system over 30 seconds. The polymerization was continued for 4 hours at 60° C. 0.5 g of prepolymer was withdrawn for final % NCO titration. The water bath temperature was reduced to 30° C.

(Part 3) 40.05 g taurine, 25.6 g of 50% NaOH, and 200.3 g of deionized water were mixed in a beaker until the taurine completely dissolved. This solution was added to the reactor system at 30° C. with vigorous stirring over 1-3 minutes. The water bath temperature was raised to 40° C. to complete the reaction. The mixture became clear and viscous after 10-15 minutes.

(Part 4) The viscous, prepolymer mixture was added to 1026.9 g of deionized over 5-10 minutes with enough agitation to form a polyurethane dispersion (PUD). The PUD was filtered through 400 mesh stainless sieve. Acetone was removed with a Rotovap at 55° C.

The average particle radius of the polyurethane in PUD-620 was measured by Malvern Zetasizer and was 14 nm (radius). The pH was 7.2. The % Solid was 32.3%.

Figure 2:
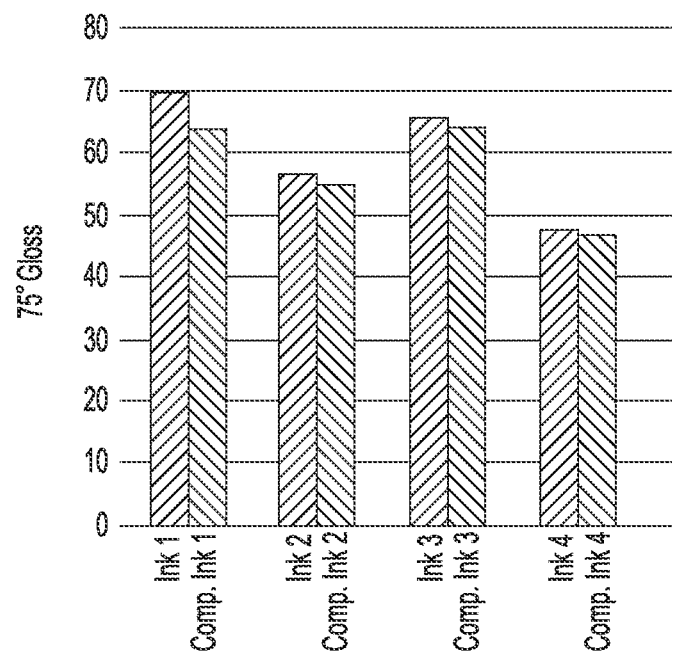
FIG. 2 is a bar graph depicting gloss measurements of examples of the ink disclosed herein and comparative inks including no polyvinylpyrrolidone applied to coated offset media.

Each example and comparative ink composition was then printed onto STERLING® Ultra Gloss (NewPage Corp.) coated offset media. The prints were dried and exposed to UV light. The optical density (OD) and 75° gloss measurements were taken of the printed images. The optical density (OD) was measured using an X-rite eXact™ densitometer and 75° gloss measurements were taken using a BYK-Gardner MICRO-GLOSS® 75° Meter (BYK-Gardner USA). The results of the optical density (OD) and 75° gloss measurements are shown below in Table 2. The results of the optical density (OD) measurements are shown in FIG. 1. The optical density values are along the Y axis and the X axis illustrates the ink formulation (the example ink is the left bar and the comparative ink is the right bar). The results of the 75° gloss measurements are shown in FIG. 2. The 75° gloss values are along the Y axis and the X axis illustrates the ink formulation (the example ink is the left bar and the comparative ink is the right bar).

TABLE 2

| Ink | OD | 75° gloss |
|---|---|---|
| Ink 1 | 1.42 | 69.5 |
| Comp. Ink 1 | 1.22 | 63.9 |
| Ink 2 | 0.89 | 56.5 |
| Comp. Ink 2 | 0.93 | 54.7 |
| Ink 3 | 1.38 | 65.7 |
| Comp. Ink 3 | 1.25 | 64.0 |
| Ink 4 | 1.03 | 47.5 |
| Comp. Ink 4 | 0.97 | 46.8 |

As shown in Table 2, most of the ink compositions including the polyvinylpyrrolidone (inks 1, 3, and 4) have an increased optical density of at least 0.06 when compared to the comparative ink compositions with the same ink formulation but without the polyvinylpyrrolidone (comp. inks 1, 3, and 4, respectively). Ink 2 does have a lower optical density when compared to comp. ink 2, but only by 0.04. This may be due, at least in part, to the noise in the optical density measurement. Typically, the noise of optical density measurements is about 0.03. Also shown in Table 2 is that all of the ink compositions including the polyvinylpyrrolidone (inks 1-4) have an increased 75° gloss when compared to the comparative ink compositions with the same ink formulation but without the polyvinylpyrrolidone (comp. inks 1-4, respectively). These results indicate that the addition of polyvinylpyrrolidone improves the image quality of the print that is formed with the example inks. This improved image quality may be due, at least in part, to a fine film in the ink layer, which may be formed by the polyvinylpyrrolidone. The fine film may lead to a smoother ink surface and therefore, better optical density and gloss.

Figure 3:
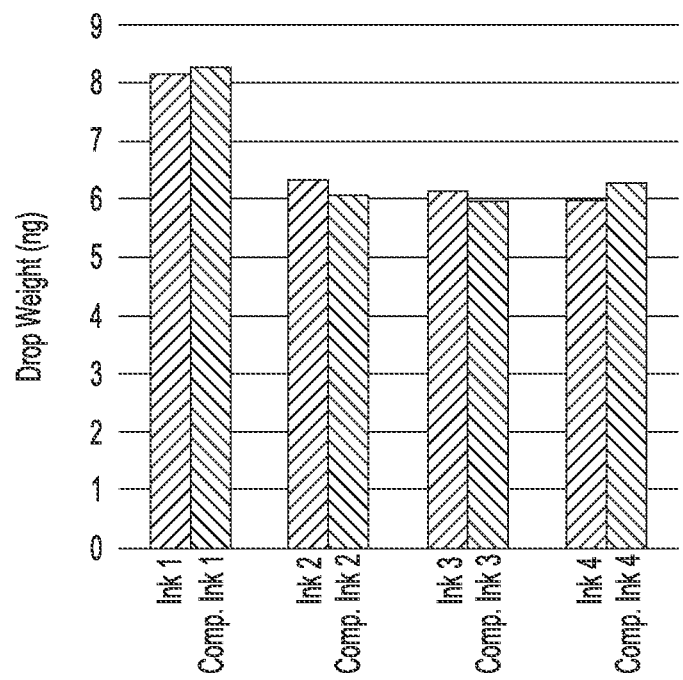
FIG. 3 is a bar graph depicting drop weight measurements of examples of the ink disclosed herein and comparative inks including no polyvinylpyrrolidone.
Figure 4:
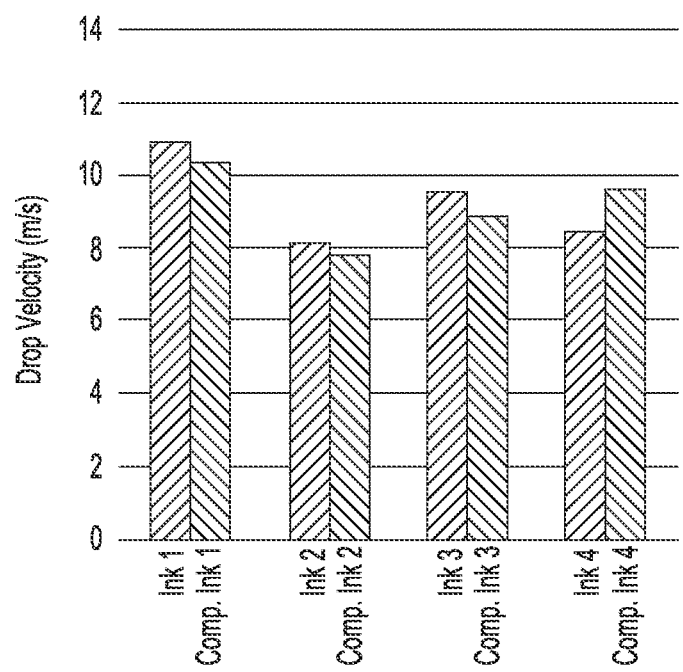
FIG. 4 is a bar graph depicting drop velocity measurements of examples of the ink disclosed herein and comparative inks including no polyvinylpyrrolidone.

The drop weight and drop velocity measurements were taken of the example and comparative inks. Drop weight can be measured by firing a known number of ink drops into a weighing pan that can be used to calculate the theoretical average drop weight. Drop velocity can be measured by using lasers to track the movement of ink drops as they are jetted through the air from the printhead. The results of the drop weight and drop velocity are shown below in Table 3. The results of the drop weight measurements are shown in FIG. 3. The drop weight values (ng) are along the Y axis and the X axis illustrates the ink formulation (the example ink is the left bar and the comparative ink is the right bar). The results of the drop velocity measurements are shown in FIG. 4. The drop weight values (m/s) are along the Y axis and the X axis illustrates the ink formulation (the example ink is the left bar and the comparative ink is the right bar).

TABLE 3

| Ink | Drop weight (ng) | Drop velocity (m/s) |
| --- | --- | --- |
| Ink 1 | 8.2 | 10.9 |
| Comp. Ink 1 | 8.3 | 10.4 |
| Ink 2 | 6.4 | 8.1 |
| Comp. Ink 2 | 6.1 | 7.8 |
| Ink 3 | 6.1 | 9.5 |
| Comp. Ink 3 | 5.9 | 8.9 |
| Ink 4 | 6.0 | 8.4 |
| Comp. Ink 4 | 6.3 | 9.6 |

As shown in Table 3, some of the ink compositions including the polyvinylpyrrolidone (inks 2 and 3) have an improved drop weight when compared to the comparative ink compositions with the same ink formulation but without the polyvinylpyrrolidone (comp. inks 2 and 3, respectively). Inks 1 and 4 do have a lower drop weight when compared to comp. inks 1 and 4, but only by 0.1 ng and 0.3 ng, respectively. Also shown in Table 3 is that most of the ink compositions including the polyvinylpyrrolidone (inks 1-3) have an increased drop velocity when compared to the comparative ink compositions with the same ink formulation but without the polyvinylpyrrolidone (comp. inks 1-3, respectively). These results indicate that the addition of polyvinylpyrrolidone tends to improve the drop weight and drop velocity of the example inks. The improved jettability, may be due, at least in part, to a soft film, which may be formed by the polyvinylpyrrolidone on the printhead resistor in the firing chamber. The soft film may keep the resistor free of contaminants and soften the impact of the collapsing drive bubble on the resistor surface, which may lead to better resistor function/heat transfer and therefore, better drop formation and ejection.

The decap time, and particle size change after 1 week in an accelerated storage environment were also measured for each of the example and comparative inks. An ink's decap can be measured by printing a warmup line, then waiting (not firing) for a set amount of time (wait time), and then printing a 2$^{nd}$ line. The visual quality of this 2$^{nd}$ line is graded to be either "good" or "bad", according to a set of visual grading standards. This process is then repeated, using increasing wait times (e.g., wait times may range from 0.01 seconds to 10 seconds). Typically, as the wait time increases, the quality of the 2$^{nd}$ line degrades. In this case, the reported decap time is the longest wait time after which the 2$^{nd}$ printed line is still considered good. The particle size change was measured using a Nanotrac Particle Size Analyzer.

Figure 5:
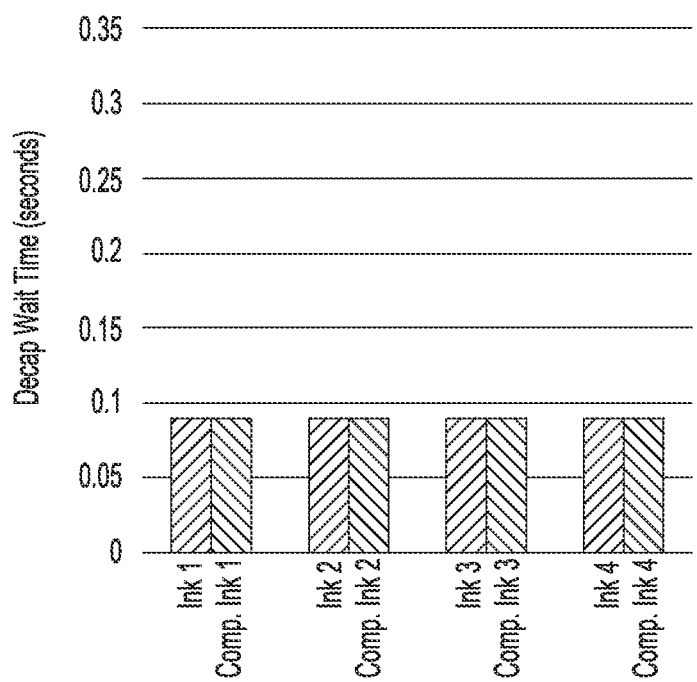
FIG. 5 is a bar graph depicting decap time measurements of examples of the ink disclosed herein and comparative inks including no polyvinylpyrrolidone.
Figure 6:
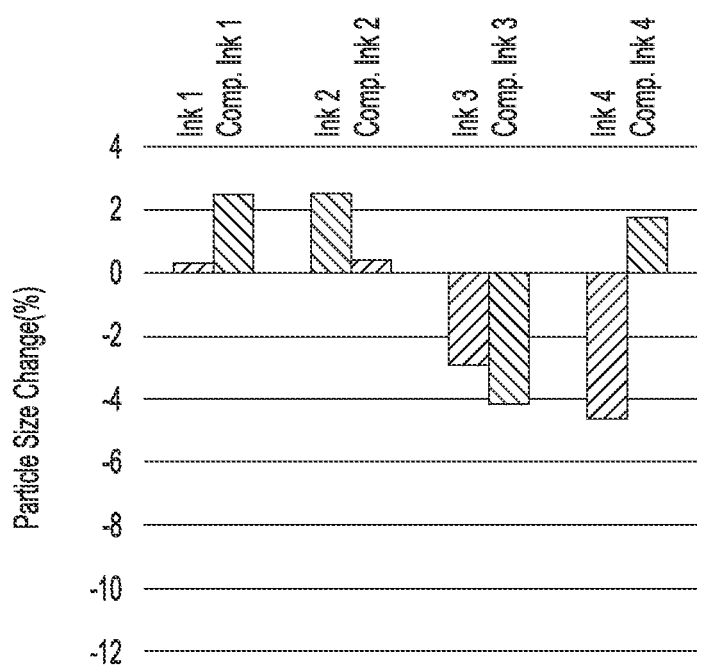
FIG. 6 is a bar graph depicting particle size change after 1 week in an accelerated storage environment of examples of the ink disclosed herein and comparative inks including no polyvinylpyrrolidone.

The results of the decap time and particle size change measurements are shown below in Table 4. The results of the decap time measurements are shown in FIG. 5. The decap wait time values (seconds) are along the Y axis and the X axis illustrates the ink formulation (the example ink is the left bar and the comparative ink is the right bar). The results of the particle size change measurements are shown in FIG. 6. The particle size change values (%) are along the Y axis and the X axis illustrates the ink formulation (the example ink is the left bar and the comparative ink is the right bar).

TABLE 4

| Ink | Decap time (seconds) | Particle size change after 1 wk 50-C ASL (%) |
| --- | --- | --- |
| Ink 1 | 0.09 | 0 |
| Comp. Ink 1 | 0.09 | 2 |
| Ink 2 | 0.09 | 3 |
| Comp. Ink 2 | 0.09 | 0 |
| Ink 3 | 0.09 | −3 |
| Comp. Ink 3 | 0.09 | −4 |
| Ink 4 | 0.09 | −5 |
| Comp. Ink 4 | 0.09 | 2 |

As shown in Table 4, all of the ink compositions including the polyvinylpyrrolidone (inks 1-4) have the same decap time as the comparative ink compositions with the same ink formulation but without the polyvinylpyrrolidone (comp. inks 1-4, respectively). Also shown in Table 4 is that some of the ink compositions including the polyvinylpyrrolidone (inks 1 and 3) have a decreased particle size change percentage when compared to the comparative ink compositions with the same ink formulation but without the polyvinylpyrrolidone (comp. inks 1 and 3, respectively). Inks 2 and 4 do have an increased particle size change when compared to comp. inks 2 and 4, but are still within an acceptable size change percentage (i.e., less than 10% change). These results indicate that the addition of polyvinylpyrrolidone does not negatively affect the decap performance or the physical stability of the example inks. Decap performance and physical stability may be unaffected, at least in part, because the amount added (from about 0.1 wt % to about 5 wt % of a total wt % of the ink composition) and the molecular weight (a number average molecular weight ranging from about 10,000 to about 40,000) of the polyvinylpyrrolidone is sufficiently low that it does not significantly increase the viscosity of the ink composition. The viscosity of the ink compositions including the polyvinylpyrrolidone (inks 1-4) on average did not increase by more than 0.10 cP when compared to the comparative ink compositions with the same ink formulation but without the polyvinylpyrrolidone (comp. inks 1-4, respectively).

Example 2

Several examples of the UV radiation curable inkjet ink composition, including the polyvinylpyrrolidone and a polyurethane dispersion were prepared. Some examples of the UV radiation curable inkjet ink composition included the anti-kogation agent. The anti-kogation agent used was CRODAFOS® N3A. The polyvinylpyrrolidone used in the example ink compositions had a number average molecular weight of about 10,000. The example ink compositions were prepared with either a black pigment (present in a dispersion with water and a styrene acrylate dispersant) or a cyan pigment (present in a dispersion with water and a styrene acrylate dispersant), and either the UV radiation curable polyurethane from example 1, PUD-620, or the commercially available UV radiation curable polyurethane, LUX® 260. The general formulation of the example ink compositions are shown in Table 5, with the wt % of each component that was used. The weight percentages of the styrene acrylate pigment dispersion (labeled black pigment dispersion and cyan pigment dispersion) and the polyurethane dispersion (labeled PUD) represent, respectively, the total pigment solids and the total polyurethane solids present in the final formulations.

TABLE 5

| Ingredient | Specific component | Ink 5A (wt %) | Ink 5B (wt %) | Ink 6A (wt %) | Ink 6B (wt %) | Ink 7A (wt %) | Ink 7B (wt %) | Ink 8A (wt %) | Ink 8B (wt %) |
|---|---|---|---|---|---|---|---|---|---|
| Anti-Kogation agent | CRODAFOS ® N3A | 0.50 | 0 | 0.50 | 0 | 0.50 | 0 | 0.50 | 0 |
| PVP | Polyvinylpyrrolidone, MW ~10,000 | 0.50 | 0.50 | 0.50 | 0.50 | 0.50 | 0.50 | 0.50 | 0.50 |
| PUD | PUD-620 | 5.00 | 5.00 | 0 | 0 | 5.00 | 5.00 | 0 | 0 |
|  | LUX ® 260 | 0 | 0 | 5.00 | 5.00 | 0 | 0 | 5.00 | 5.00 |
| Co-solvent | 1-(2-hydroxyethyl)-2-pyrrolidone | 10.00 | 10.00 | 10.00 | 10.00 | 10.00 | 10.00 | 10.00 | 10.00 |
| Surfactant | SURFYNOL ® CT-211 | 0.64 | 0.64 | 0.64 | 0.64 | 0.64 | 0.64 | 0.64 | 0.64 |
| Additive | LEG-1 | 1.00 | 1.00 | 1.00 | 1.00 | 1.00 | 1.00 | 1.00 | 1.00 |
| Photoinitiator | IRGACURE ®819 | 0.10 | 0.10 | 0.10 | 0.10 | 0.10 | 0.10 | 0.10 | 0.10 |
| Colorant | Black pigment dispersion | 2.75 | 2.75 | 2.75 | 2.75 | 0 | 0 | 0 | 0 |
|  | Cyan pigment dispersion | 0 | 0 | 0 | 0 | 2.50 | 2.50 | 2.50 | 2.50 |
| Water |  | Balance | Balance | Balance | Balance | Balance | Balance | Balance | Balance |

Figure 7:
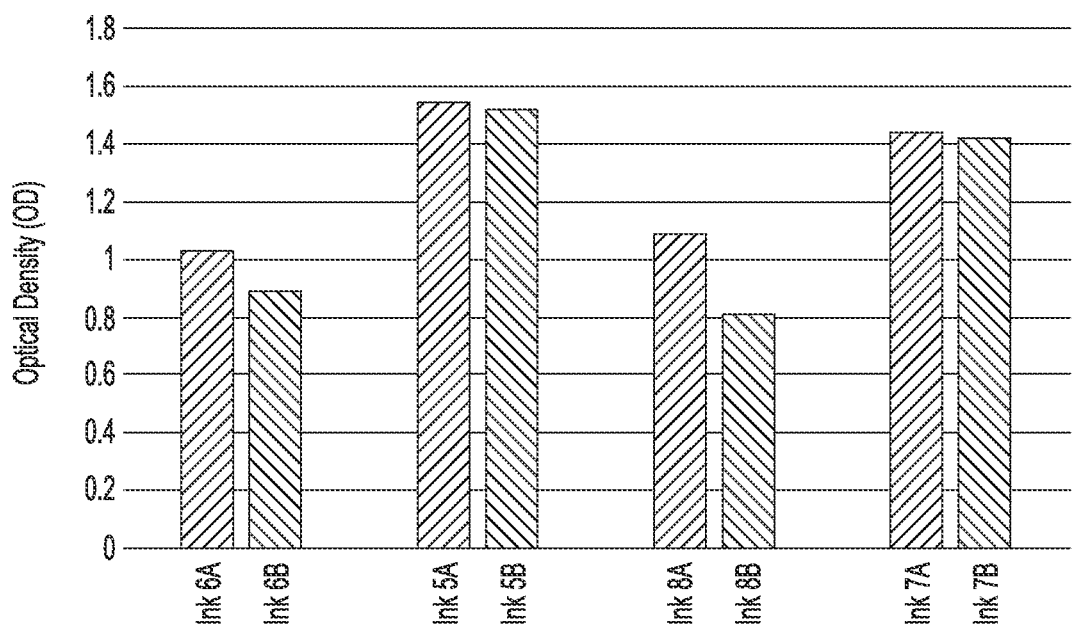
FIG. 7 is a bar graph depicting optical density measurements of examples of the ink disclosed herein including an anti-kogation agent and not including an anti-kogation agent applied to coated offset media.
Figure 8:
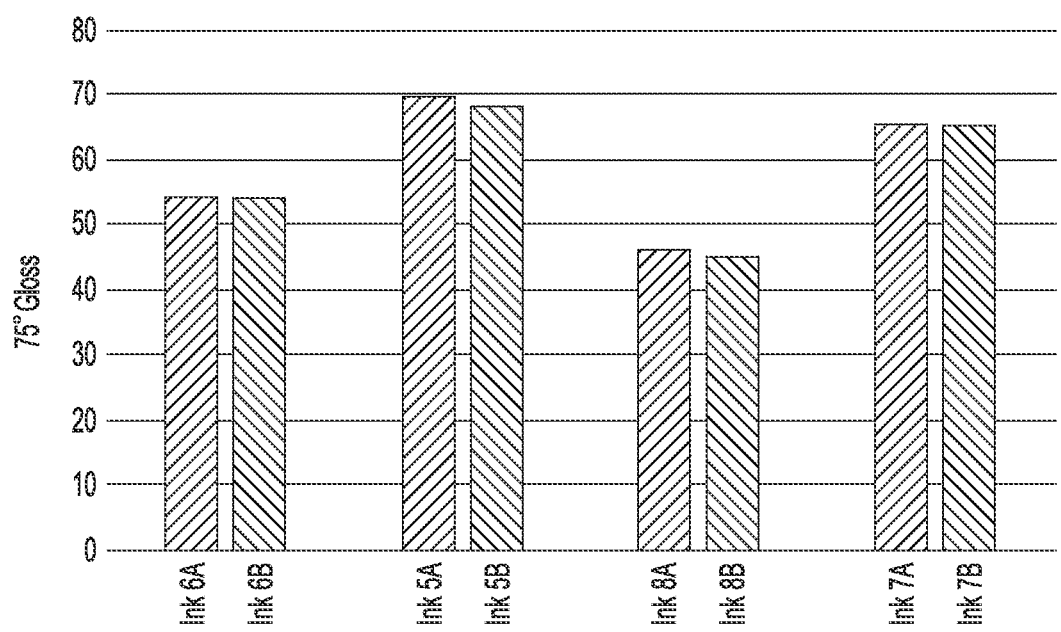
FIG. 8 is a bar graph depicting gloss measurements of examples of the ink disclosed herein including an anti-kogation agent and not including an anti-kogation agent applied to coated offset media.

Each example ink composition was then printed onto STERLING® Ultra Gloss (NewPage Corp.) coated offset media. The prints were dried and exposed to UV light. The optical density (OD) and 75° gloss measurements were taken of the printed images. The optical density (OD) was measured using an X-rite eXact™ densitometer and 75° gloss measurements were taken using a BYK-Gardner MICRO-GLOSS® 75° Meter (BYK-Gardner USA). The results of the optical density (OD) and 75° gloss measurements are shown below in Table 6. The results of the optical density (OD) measurements are shown in FIG. 7. The optical density values are along the Y axis and the X axis illustrates the ink formulation (the example ink with the anti-kogation agent is the left bar and the example ink without the anti-kogation agent is the right bar). The results of the 75° gloss measurements are shown in FIG. 8. The 75° gloss values are along the Y axis and the X axis illustrates the ink formulation (the example ink with the anti-kogation agent is the left bar and the example ink without the anti-kogation agent is the right bar).

TABLE 6

| Ink | OD | 75° gloss |
|---|---|---|
| Ink 5A | 1.54 | 69.7 |
| Ink 5B | 1.52 | 68.3 |

TABLE 6-continued

| Ink | OD | 75° gloss |
|---|---|---|
| Ink 6A | 1.03 | 54.2 |
| Ink 6B | 0.89 | 54.0 |
| Ink 7A | 1.44 | 65.6 |
| Ink 7B | 1.42 | 65.4 |
| Ink 8A | 1.09 | 46.3 |
| Ink 8B | 0.81 | 45.2 |

As shown in Table 6, all of the ink compositions including the anti-kogation agent (inks 5A, 6A, 7A, and 8A) have an increased optical density (of at least 0.02, and as much as 0.28) when compared to the ink compositions with the same ink formulation but without the anti-kogation agent (inks 5B, 6B, 7B, and 8B, respectively). Also shown in Table 6 is that all of the ink compositions including the anti-kogation agent (inks 5A, 6A, 7A, and 8A) have an increased 75° gloss when compared to the ink compositions with the same ink formulation but without the anti-kogation agent (inks 5B, 6B, 7B, and 8B, respectively). These results indicate that the addition of the anti-kogation agent improves the image quality of the print that is formed with the example inks. This improved image quality may be due, at least in part, to the slightly higher drop weight and drop velocity exhibited by the inks containing the anti-kogation-agent. Higher drop weight and drop velocity may allow more ink to be deposited in a more regular fashion, which may create a thicker, stronger film with higher optical density and gloss.

Figure 9:
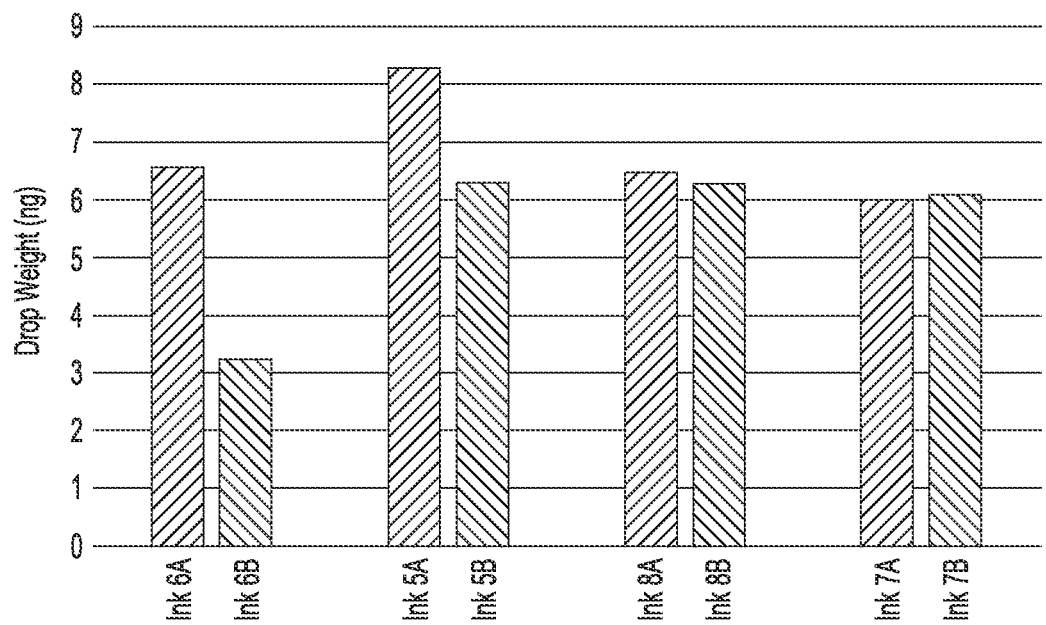
FIG. 9 is a bar graph depicting drop weight measurements of examples of the ink disclosed herein including an anti-kogation agent and not including an anti-kogation agent.
Figure 10:
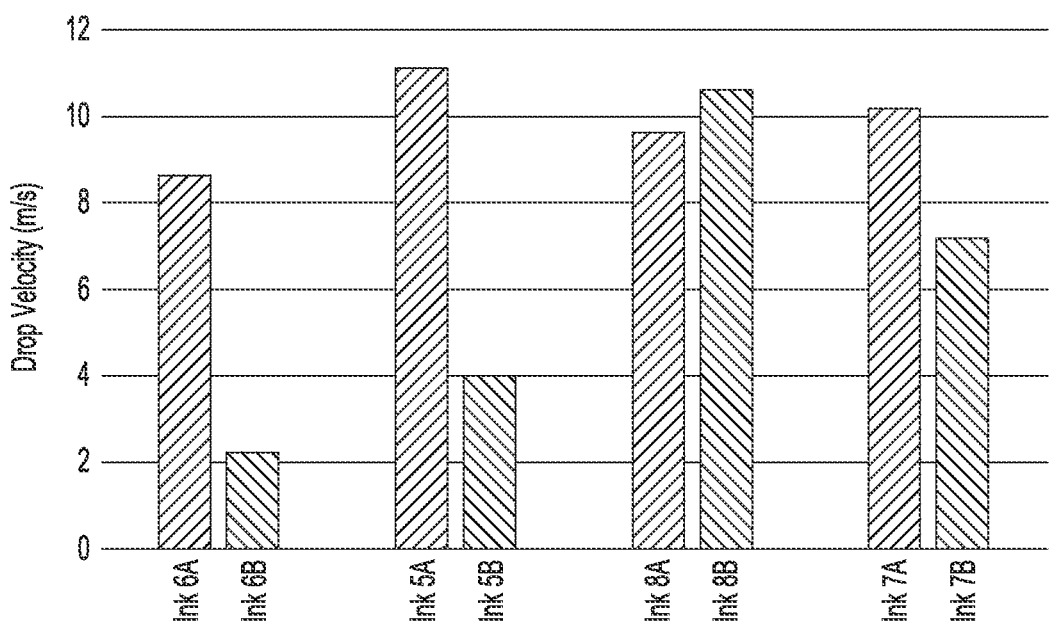
FIG. 10 is a bar graph depicting drop velocity measurements of examples of the ink disclosed herein including an anti-kogation agent and not including an anti-kogation agent.

The drop weight and drop velocity measurements were taken of the example inks. The results of the drop weight and drop velocity are shown below in Table 7. The results of the drop weight measurements are shown in FIG. 9. The drop weight values (ng) are along the Y axis and the X axis illustrates the ink formulation (the example ink with the anti-kogation agent is the left bar and the example ink without the anti-kogation agent is the right bar). The results of the drop velocity measurements are shown in FIG. 10. The drop weight values (m/s) are along the Y axis and the X axis illustrates the ink formulation (the example ink with the anti-kogation agent is the left bar and the example ink without the anti-kogation agent is the right bar).

TABLE 7

| Ink | Drop weight (ng) | Drop velocity (m/s) |
|---|---|---|
| Ink 5A | 8.3 | 11.1 |
| Ink 5B | 6.3 | 4.0 |
| Ink 6A | 6.5 | 8.6 |
| Ink 6B | 3.2 | 2.2 |
| Ink 7A | 6.0 | 10.2 |
| Ink 7B | 6.1 | 7.2 |
| Ink 8A | 6.5 | 9.6 |
| Ink 8B | 6.3 | 10.6 |

As shown in Table 7, most of the ink compositions including the anti-kogation agent (inks 5A, 6A, and 8A) have an improved drop weight (of as much as 3.3 ng) when compared to the ink compositions with the same ink formulation but without the anti-kogation agent (inks 5B, 6B, and 8B, respectively). Ink 7A does have a lower drop weight when compared to ink 7B, but only by 0.1 ng. Also shown in Table 7 is that most of the ink compositions including the anti-kogation agent (inks 5A, 6A, and 7A) have an increased drop velocity (of as much as 7.1 m/s) when compared to the ink compositions with the same ink formulation but without the anti-kogation agent (inks 5B, 6B, and 7B, respectively). Ink 8A does have a decreased drop velocity when compared to ink 8B, but only by 1.0 m/s. These results indicate that the addition of the anti-kogation agent tends to improve the drop weight and drop velocity of the example inks. The improved jettability, may be due, at least in part, to the anti-kogation agent acting as a resistor cleaner, which enables better drop formation and therefore, better drop weight and drop velocity.

It is to be understood that the ranges provided herein include the stated range and any value or sub-range within the stated range. For example, a range from about 5 wt % to about 20 wt % should be interpreted to include not only the explicitly recited limits of about 5 wt % to about 20 wt %, but also to include individual values, such as 6.5 wt %, 10 wt %, 12.5 wt %, 15 wt %, etc., and sub-ranges, such as from about 12 wt % to about 18 wt %, from about 5 wt % to about 7 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. An ultraviolet (UV) curable inkjet ink composition, comprising:
a pigment dispersed by an anionic polymeric dispersant;
an organic co-solvent;
polyvinylpyrrolidone having a number average molecular weight ranging from about 10,000 to about 40,000;
an anti-kogation agent;
a photoinitiator;
a UV radiation curable polyurethane formed from:
a polyisocyanate;
an acrylate or methacrylate, the acrylate or methacrylate having at least two hydroxyl functional groups and having an acrylate functional group or a methacrylate functional group;
an other acrylate or methacrylate, the other acrylate or methacrylate having one hydroxyl functional group or one amino functional group; and
a hydroxyl or an amine containing a sulfonate functional group, wherein the hydroxyl or the amine containing the sulfonate functional group is selected from the group consisting of taurine and aminoethylaminopropylsulfonate; and
a balance of water.

2. The UV curable inkjet ink composition as defined in claim 1 wherein the anti-kogation agent is present in an amount ranging from about 0.1 wt % to about 1 wt % of a total wt % of the UV curable inkjet ink composition.

3. The UV curable inkjet ink composition as defined in claim 1 wherein the polyvinylpyrrolidone is present in an amount ranging from about 0.1 wt % to about 5 wt % of the total wt % of the UV curable inkjet ink composition.

4. The UV curable inkjet ink composition as defined in claim 1 wherein the anionic polymeric dispersant is a styrene-acrylic dispersant.

5. The UV curable inkjet ink composition as defined in claim 1, further comprising a surfactant present in an amount ranging from about 0.1 wt % to about 1 wt % of the total wt % of the UV curable inkjet ink composition.

6. The UV curable inkjet ink composition as defined in claim 1 wherein:
the pigment dispersed by the anionic polymeric dispersant is present in an amount ranging from about 1 wt % to about 5 wt % of the total wt % of the UV curable inkjet ink composition;
the organic co-solvent is present in an amount ranging from about 5 wt % to about 20 wt % of the total wt % of the UV curable inkjet ink composition;
the polyvinylpyrrolidone is present in an amount ranging from about 0.1 wt % to about 5 wt % of the total wt % of the UV curable inkjet ink composition;
the photoinitiator is present in an amount ranging from about 0.05 wt % to about 1 wt % of the total wt % of the UV curable inkjet ink composition; and
the UV radiation curable polyurethane is present in an amount ranging from about 1 wt % to about 20 wt % of the total wt % of the UV curable inkjet ink composition.

7. The UV curable inkjet ink composition as defined in claim 1 wherein the polyurethane is further formed from a polyol.

8. The UV curable inkjet ink composition as defined in claim 1 wherein the composition is a thermal inkjet ink composition.

9. A method for improving drop weight, drop velocity, optical density, and gloss of a UV curable inkjet ink, the method comprising:
incorporating from about 0.1 wt % to about 5 wt % of the polyvinylpyrrolidone in the ink composition of claim 1.

10. The method as defined in claim 9 wherein prior to the incorporating, the method further comprises forming the composition by:
mixing the organic co-solvent with a pigment dispersion including water and the pigment dispersed by the anionic polymeric dispersant;

mixing the photoinitiator with a polyurethane dispersion including water and the UV curable polyurethane; and adding the polyurethane dispersion to the pigment dispersion.

11. The method as defined in claim 10, further comprising forming the polyurethane dispersion by:

polymerizing the polyisocyanate and the acrylate or methacrylate in a reactor with an organic solvent and a catalyst;

adding the other acrylate or methacrylate to the reactor;

allowing polymerization to continue to form a polyurethane solution;

cooling the polyurethane solution; and adding an aqueous solution of the hydroxyl or the amine containing the sulfonate functional group to the polyurethane solution with mixing at a temperature ranging from about 30° C. to about 50°; and removing the organic solvent by distillation to form the polyurethane dispersion.

12. The method as defined in claim 9 wherein a total wt % of the composition includes:

from about 1 wt % to about 5 wt % of the pigment dispersed by the anionic polymeric dispersant;

from about 5 wt % to about 20 wt % of the organic co-solvent;

from about 0.05 wt % to about 1 wt % of the photoinitiator;

from about 1 wt % to about 20 wt % of the UV radiation curable polyurethane;

and a balance of the water.

13. The method as defined in claim 9, further comprising adding a surfactant to the composition, the surfactant being present in an amount ranging from about 0.1 wt % to about 1 wt % of a total wt % of the composition.

* * * * *